UNITED STATES PATENT OFFICE.

ROBERT ANDREWS, OF MILWAUKEE, WISCONSIN; SAMUEL B. PIERCE, SAMUEL S. JOHNSON, ROBERT ANDREWS, AND ROBERT N. AUSTIN, ASSIGNEES OF SAID ROBERT ANDREWS.

IMPROVED COMPOSITION FOR STUFFING LEATHER.

Specification forming part of Letters Patent No. 90,333, dated May 25, 1869; Reissue No. 3,706, dated November 2, 1869.

*To all whom it may concern:*

Be it known that I, ROBERT ANDREWS, of the city and county of Milwaukee, in the State of Wisconsin, have invented a new and useful composition of matter constituting a new article of manufacture; and I do hereby declare that the following is a full and exact description of the same.

The nature of my invention is a new compound of tar known in commerce as "wood-tar," "pitch," "North Carolina," or "Southern" tar, and "Stockholm tar," and tallow, oil, fat, grease, and fatty or greasy matter, or one or more of said substances, treated according to the process fully described in the other specification annexed to this application, which compound I denominate "Andrews' Taroid."

The chief feature of my invention is tar so treated in connection with tallow, oil, fat, grease, and fatty or greasy matter, or one or more of said substances, that it is deprived of its sticky and other objectionable qualities, and fitted to serve as an ingredient in compositions of stuffing leather, saturating cordage, and for other similar and for lubricating and sanitary purposes, the tar being rendered completely absorbable by the pores, and capable, with the other ingredient or ingredients of the compound, of entering as one substance into the fibers and body of the materials to which it is applied, as well as less sensitive to changes of temperature.

In further describing my invention I shall, for brevity, speak of tar treated in connection with tallow only; but in all cases oil, fat, grease, fatty and oily matter, or one or more of them, may be used, with a difference only in the quality or cost of the product.

I treat tar in connection with tallow, the proportions of the two differing with the uses for which the composition is designed, by the application of heat and agitation, as described in the other specification annexed to this application, and hereinbefore referred to. For leather stuffing, I use about equal parts, by weight, of tar and tallow. For cordage, and for purposes where a thinner composition is required, it is better to use more tar—say from sixty to seventy per cent. As a rule, the more tar used, up to seventy-five per cent., the thinner the compound will be; but with less than twenty-five per cent. of tallow the sticky and other objectionable qualities of the tar cannot be overcome, nor will it be rendered completely absorbable. Generally it is desirable to use a proportion of tar a little exceeding one-half, but any proportion may be used from twenty-five up to seventy-five per cent. of tar and the remainder of tallow.

What I claim as my invention, and desire to secure by Letters Patent, is—

1. Tar so treated in connection with tallow, oil, fat, grease, and fatty or greasy matter, or one or more of said substances, that it becomes completely absorbable and no longer sensitive to changes of temperature.

2. The compound of tar and tallow, oil, fat, grease, and fatty or greasy matter, or one or more of them, acting as one substance, described in the specification as a new article of manufacture, all substantially as and for the purposes set forth.

ROBT. ANDREWS.

Witnesses:
EMIL WALLBER,
HENRY SUTTER.